Patented Jan. 21, 1947

2,414,458

UNITED STATES PATENT OFFICE 2,414,458

VITAMINIC PRODUCTS AND PROCESSES

Norris D. Embree and Edgar M. Shantz, Rochester, N. Y.

No Drawing. Application April 9, 1941, Serial No. 387,772

12 Claims. (Cl. 167—81)

This invention relates to improved methods for preparing substances having vitamin A activity. It also relates to improved methods for preparing substances from which vitamin A can be prepared. It also pertains to new products which may be converted into substances having vitamin A activity.

Vitamin A is known to occur in liver oils as esters of fatty acids, particularly those of high molecular weight. It also occurs in the form of free alcohol.

This invention has for its object to provide a new source of vitamin A. A further object is to provide a substance which has heretofore been unknown which can be converted into vitamin A. A further object is to provide improved methods for preparing this substance and for preparing vitamin A. Other objects will appear hereinafter.

We have discovered that liver oils contain a substance which has no vitamin A activity but which can be converted into vitamin A or a substance having vitamin A activity by heat treatment. The above objects are accomplished by our invention which includes subjecting liver oils or derivatives or fractions thereof to a heat treatment whereby this vitamin A precursor is converted into vitamin A or a substance having vitamin A activity. Our invention also includes the procedure whereby this precursor is isolated as well as the precursor as a new substance.

In the following examples and descriptions we have set forth several of the preferred embodiments of our invention; however, it is to be understood that they are given for the purpose of illustration and not in limitation thereof.

The new substance which we have prepared from liver oils exhibits a peak of absorption in ultra violet at 286 m$\mu$; it exhibits an absorption peak for its SbCl$_3$ product at about 428–430 m$\mu$. When distilled under analytical molecular conditions it has an elimination maximum at approximately 225–230 C. It has no vitamin A activity as determined by biological and physicochemical tests. However, heating to elevated temperature, preferably above 150° C., causes conversion of this substance into a substance having vitamin A activity. From all physical, chemical, and biological tests this conversion substance appears to be vitamin A alcohol.

The following table illustrates the characteristics of the new substance (hereinafter designated as 428 chromogen) as compared with vitamin A in alcohol form or vitamin A in its natural ester form:

Table I

|  | 428 chromogen | Vit. A in alc. form | Vit. A as it naturally occurs as esterified with fatty acids |
|---|---|---|---|
| Wavelength at peak of absorption maximum in ultraviolet | About 286 m$\mu$ (in ethanol). | 325–328 m$\mu$ (in ethanol) | 325–328 m$\mu$ (in ethanol). |
| Wavelength at peak of absorption band of SbCl$_3$ product | 428–430 m$\mu$ | 620–623 m$\mu$ | 620–623 m$\mu$. |
| Elimination maximum by analytical molec. distillation | 225–230° C | 123° C | 180–220° C. depending upon ester. |
| Effect of treatment with anhydrous alcoholic HCl | No effect | "Cyclizes," giving a substance with u. v. absorption max. at 349, 368, and 389 m$\mu$. | "Cyclizes," somewhat more slowly than vit. A alcohol. |
| Distribution ratio between equal volumes of petroleum ether and 83% ethyl alcohol | 75% ether layer, 25% alcohol layer. | 50% ether layer, 50% alcohol layer. | 99.5% ether layer, .5% alcohol layer. |

Experimental evidence indicates that the 428 chromogen in the original oils, or their fractions, is in ester form and that heating converts it into vitamin A ester; also that the 428 chromogen in saponification concentrates is in an alcohol form and that heating converts it into vitamin A alcohol.

The following clearly illustrates the lack of vitamin A activity and the conversion into a substance having vitamin A activity.

Whale liver oil was saponified and the unsaponifiable fraction separated and distilled under molecular conditions. The saponification, of course, converted the vitamin A present in the whale liver oil into a vitamin A alcohol. During distillation the temperature was maintained below 150° C. Vitamin A alcohol distills under these conditions at about 120° C., so that it was substantially entirely eliminated from the undistilled residue. The undistilled residue (A) which contained only a trace of vitamin A was then redistilled under molecular conditions to remove any possible trace of vitamin A alcohol. This distillation was also conducted at a low temperature. The undistilled residue (B) was biologically tested and found to contain no detectable amount of vitamin A. The residue was, however, found to contain a substance whose antimony trichloride reaction product had an absorption band at 428 mµ. This residue (B) was then distilled under molecular conditions. At a temperature of 220° C. a fraction was obtained having a high content of vitamin A. Also the distillate contained the new substance—428 chromogen. This distillate containing a mixture of vitamin A and 428 chromogen was distilled at a low temperature, below 150° C. The distillate contained a substantial amount of vitamin A alcohol as determined by chemical and biological tests. The residue (C) was substantially free of vitamin A activity and contained less 428 chromogen than residue (B). It is thus seen that a residue completely freed of vitamin A was by heat treatment converted into a substance having vitamin A activity, which apparently is vitamin A alcohol and which was distilled therefrom to form a concentrated distillate.

The new substance can be prepared in concentrated form by subjecting the liver oil to saponification followed by a treatment removing sterols, vitamin A and other impurities. The following example illustrates this mode of preparation:

*Example I*

Two hundred grams of whale liver oil were saponified in the well known manner. The unsaponifiable fraction was removed from the saponification mixture and dissolved in five parts by weight of methyl alcohol. This mixture was cooled to dry ice temperature to precipitate sterols. The liquid portion was separated from the precipitated sterols and the alcohol vaporized therefrom. The residue was dissolved in 150 grams of corn oil residue from molecular distillation of corn oil and 50 grams of low boiling constant yield oil. This was distilled in a cyclic molecular still by passing over the vaporizing surface twice at 125° C. and twice at 150° C. The pressure during the distillation was about .003–.006 mm. of Hg. Fifty grams of low boiling constant yield oil were added to the undistilled residue and the distillation repeated to remove all vitamin A present. The undistilled residue was then saponified and the nonsaponifiable portion dissolved in 50 cc. of petroleum ether. This solution was subjected to chromatographic absorption in a column filled with aluminum oxide. The column was made up of a piece of 20 mm. glass tubing and the length of the aluminum oxide column was approximately 15 centimeters. The column containing the absorbed material was then washed with 200 cc. petroleum ether. The new substance was adsorbed in the first six centimeters at the top of the column. The first half centimeter and the last half centimeter of this band was discarded. The five centimeter central portion was removed and washed with ethyl alcohol. The ethyl alcohol extract was distilled to remove the alcohol and the residue weighing 1.35 grams was found to have the properties described in Table I for 428 chromogen. It had an extinction coefficient at 286 mµ of about 446. The extinction coefficient varies from about 150 to 1000 in the concentrates and the particular value depends upon the concentration.

A small portion of this material was dissolved in corn oil and introduced into seven capillary tubes. Six of these tubes were heated in an oil bath maintained at 225° C. for varying lengths of time as shown in the following table.

*Table II*

| Tube No. | Time, min. | Vit. A potency |
|---|---|---|
| | | *Units/gram* |
| Orig | 0 | 0 |
| 1 | ¼ | 210 |
| 2 | ½ | 1,135 |
| 3 | 1 | 3,255 |
| 4 | 2 | 5,430 |
| 5 | 4 | 8,375 |
| 6 | 6 | 9,955 |

After the heating period the capillary tube was removed and plunged into cold oil. The vitamin A content of the original as well as the various heated tubes was determined by the antimony trichloride blue color measured with the Evelyn colorimeter.

The new substance can be converted into vitamin A by a number of methods. It may be removed from the liver oil or livers in concentrated form by saponification or solvent extraction. The unsaponifiable fraction or the solvent extract is then subjected to heat treatment to convert it into vitamin A. We prefer, however, to directly subject the liver oil to the heat treatment and then if a vitamin A concentrate is desired, remove the vitamin A thus formed in the form of a concentrate. This can be accomplished by distilling the vitamin A as formed from the heat treated oil or by distilling after substantial or complete conversion. Either of these methods may also be applied to the concentrate mentioned above.

The actual conversion, either in connection with the oil or concentrate, is brought about by heating. An elevated temperature, and preferably one above 150° is used. The conversion at a temperature below 150° is relatively slow and accordingly not of great commercial importance. The most desirable degree of conversion in one exposure will require from 3 to 30 hours at 150° and from ½ to 10 seconds at 300°. A detectable conversion should be noticed with exposures of as little as ½ hour at 150° or 1/10 of a second at 300°. If the time of exposure at 150° is over 100 hours or over 50 seconds at 300° the decomposition of the vitamin A will affect the economy of the process. Temperatures of above 300° could be used, but the great loss of power necessary to heat and cool the oil so rapidly should make the use of these temperatures impractical on a commercial scale.

The material to be converted, whether concentrate or oil, can be merely heated in a batch apparatus. Care should be taken to make sure that the vitamin A formed is not lost by decomposition. This can be avoided by utilizing short exposures to temperatures of about 200° C. or not too much in excess thereof. Also, it is best that oxygen or air be excluded during treatment. A continuous method of conversion can also be used in which the substance to be converted is passed through heated capillary tubes and preferably quickly cooled. In this way the danger of overheating and destruction of vitamin A can be avoided by accurate timing of the heating period. If the vitamin A is to be recovered from the conversion mixture in concentrated form it is best that the converted mixture be distilled, or solvent extracted to remove the vitamin A. The residue may then be subjected again to the heat treatment to form additional vitamin A. This procedure may be continued until all, or substantially all, of the new substance has been converted into vitamin A.

A method of conversion which we prefer is a variation of the above mentioned continuous procedure in which the mixture to be converted is heated in a molecular still to conversion temperature and the vitamin A alcohol formed is removed almost simultaneously in the still. The undistilled residue containing the new substance may be repeatedly recycled through a still. If a centrifugal still is used wherein the distilland is passed over a vaporizing surface is a thin film by centrifugal force, the temperature may be higher than with gravity flow stills since the exposure to heat is short and can be accurately controlled. Temperatures of 250 to 300° C. can be used under such circumstances. In connection with such distillations it is of value to adjust the temperature and pressure in the still, whatever its type may be, so that the vitamin A is distilled as soon as formed while little of the 428 chromogen distills. A satisfactory condition is a temperature of about 250° C. and a pressure of about 150 microns. These conditions are not critical and can be varied to a substantial degree. As a matter of fact, it is perfectly feasible to use conditions which would normally cause distillation of the 428 chromogen but to utilize a very short period so that the vitamin A alcohol which would distill at a much faster rate under such conditions is removed while the 428 chromogen substance remains undistilled. All of the foregoing expedients can be used in connection with procedure in which the heating takes place in stages with or without intermediate removal of vitamin A.

Example II

Whale liver oil was passed twelve times over the vaporizing surface of a cyclic molecular still; i. e., the undistilled residue was collected after each passage and recirculated through the still. The preheater of the still was adjusted so that the oil was heated to 230° C. before it passed to the vaporizing surface. The vaporizing surface was unheated and the oil passing from the bottom of the vaporizing surface had a temperature of 170° C. The pressure in the still was approximately four microns. The undistilled residue after this treatment had a vitamin potency of 15,500,000 units. The vitamin A fraction contained a potency of 6,750,000 units. The whale oil introduced into the still at the beginning of the experiment had a total vitamin A potency of 15,250,000 units. Thus, the overall vitamin A potency was increased by 45.9%.

Example III

A pound of lamb liver was ground and the oil extracted from it with ethyl ether. After removal of the solvent the residual oil was saponified and the non-saponifiable material extracted with a solvent in the usual manner. The non-saponifiable fraction (which contained about 100,000 units of vitamin A in the alcohol form) was dissolved in 75 cc. of high-boiling undistilled residue of corn oil and 25 cc. of low-boiling constant yield oil. This was placed in a cyclic molecular still and passed over the distilling column twice at 125° C. and twice at 150° C. 25 cc. more of the low-boiling constant yield were added to the residue and the process repeated to insure complete removal of the vitamin A by distillation.

The residue oil was drained from the still, saponified, and extracted. The non-saponifiable extract was redissolved in 5 cc. of corn oil residue. When a few drops of this oil solution were treated with $SbCl_3$ reagent, the product showed an absorption band at 428 m$\mu$ with no indication of the typical vitamin A band at 620 m$\mu$. 1 cc. of the oil solution was then drawn up in a spiral capillary tube and the tube was immersed in an oil bath at 225° C. for six minutes and then cooled. After heating, one drop of this oil solution gave a deep blue color with the $SbCl_3$ reagent, showing the typical vitamin A absorption band at 620 m$\mu$.

The 428 chromogen has also been found in fish liver oils such as shark liver oil. The preferred source is mammalian liver or oil and especially whale liver oil. The 428 chromogen, when prepared by saponification of the liver oil has, in addition to the properties mentioned, the following properties: the formula $C_{40}H_{58}(OH)_2$; a melting point of 95°–97° C.; forms a dinitro benzoate having a melting point of approximately 200° C.; forms a phenylazobenzoate having a melting point of 153–155° C.; a molecular weight of approximately 572; 8 double bonds in its molecule; a specific optical rotation of about −1.35 (determined in chloroform at 25° C. and in light having a wave length of 546.1 m$\mu$) and an extinction coefficient in ultra violet light of about 700 at approximately 286 m$\mu$ (for the alcohol form). It is to be understood that the terms "mammalian liver oil" and "whale liver oil" as used in the claims shall include fractions, extracts and non-saponifiable portions of such oils.

What we claim is:

1. The process of increasing the vitamin A activity of a mammalian liver oil, which contains a substance having an absorption maximum at 286 m$\mu$ and whose antimony trichloride reaction product has an absorption maximum at 428 m$\mu$, and which has little or no vitamin A activity, which process comprises passing the oil through a capillary tube heated to a temperature of between 150° and 300° C. the heating period being approximately inversely proportional to the temperature and ranging from 3 hours for the temperature of 150° C. to ½ second for the temperature of 300° C. whereby the total amount of vitamin A-active substance contained in the starting material is substantially increased.

2. The process which comprises in combination subjecting a member of the group consisting of liver oils, fractions, extracts and non-saponifiable portions thereof to high vacuum unobstructed path distillation to remove substantially all of the vitamin A content and subjecting the undistilled residue to further high vacuum unobstructed path distillation at a temperature of between about 150° and 300° C., the distillation period being approximately inversely proportional to the temperature and ranging from 3 hours for the temperature of 150° C. to ½ second for the temperature of 300° C. whereby the total amount of vitamin A active substance recovered from the starting material is in substantial excess of 100% of that originally contained in the starting material.

3. The process which comprises in combination subjecting mammalian liver oil to high vacuum unobstructed path distillation to remove substantially all of the vitamin A content and subjecting the undistilled residue to further high vacuum unobstructed path distillation at a temperature of between 150° and 300° C., the distillation period being approximately inversely proportional to the temperature and ranging from 3 hours for the temperature of 150° C. to ½ second for the temperature of 300° C. whereby the total amount of vitamin A active substance recovered from the starting material is in substantial excess of 100% of that originally contained in the starting material.

4. The process which comprises in combination subjecting whale liver oil, to high vacuum unobstructed path distillation to remove substantially all of the vitamin A content and subjecting the undistilled residue to further high vacuum unobstructed path distillation at a temperature of between 150° and 300° C., the distillation period being approximately inversely proportional to the temperature and ranging from 3 hours for the temperature of 150° C. to ½ second for the temperature of 300° C. whereby the total amount of vitamin A active substance recovered from the starting material is in substantial excess of 100% of that originally contained in the starting material.

5. The process which comprises in combination subjecting whale liver oil, to high vacuum unobstructed path distillation to remove substantially all of the vitamin A content and subjecting the undistilled residue to further high vacuum unobstructed path distillation at a temperature of between 150° and 300° C. the distillation period being approximately inversely proportional to the temperature and ranging from ½ hour for the temperature of 150° C. to $\frac{1}{10}$ second for the temperature of 300° C. whereby the total amount of vitamin A active substance recovered from the starting material is in substantial excess of 100% of that originally contained in the starting material.

6. The process which comprises in combination subjecting whale liver oil, to repeated high vacuum unobstructed path distillation at a temperature of between 150°–300° C., the heating period for each distillation being approximately inversely proportional to the temperature and ranging from 3 hours for the temperature of 150° C. to ½ second for the temperature of 300° C. whereby the total amount of vitamin A active substance recovered from the starting material is in substantial excess of 100% of that originally contained in the starting material.

7. The process which comprises in combination subjecting whale liver oil, to high vacuum unobstructed path distillation to remove substantially all of the vitamin A content and subjecting the undistilled residue to a heat treatment at a temperature of between 150° and 300° C., the heating period being approximately inversely proportional to the temperature and ranging from 3 hours for the temperature of 150° C. to ½ second for the temperature of 300° C. whereby the total amount of vitamin A active substance recovered from the starting material is in substantial excess of 100% of that originally contained in the starting material.

8. The process of increasing the vitamin A recovery which comprises in combination subjecting whale liver oil, to high vacuum unobstructed path distillation to remove substantially all of the vitamin content and subjecting the undistilled residue to further high vacuum unobstructed path distillation by causing it to pass by centrifugal force over a distilling surface heated to a temperature of between 150° and 300° C., the heating period being approximately inversely proportional to the temperature and ranging from 3 hours for the temperature of 150° C. to ½ second for the temperature of 300° C. whereby the total amount of vitamin A active substance recovered from the starting material is in substantial excess of 100% of that originally contained in the starting material.

9. The process for obtaining vitamin A which comprises in combination removing substantially all of the vitamin A from a liver oil by high vacuum unobstructed path distillation and then subjecting the oil which is substantially freed of vitamin A to a heat treatment at a temperature of between about 150° and 300° C. until a substantial amount of vitamin A has been formed therein.

10. The process for obtaining vitamin A which comprises in combination removing substantially the whole of the vitamin A naturally present in whale liver oil by high vacuum unobstructed path distillation and then subjecting the whale liver oil substantially freed of vitamin A to a heat treatment at a temperature between about 150° and 300° C. until a substantial amount of vitamin A has been formed therein.

11. The process of synthesizing vitamin A which comprises subjecting a concentrate composed primarily of a chemical compound which is obtainable from liver oils and which has the following properties: (1) the formula $C_{40}H_{58}(OH)_2$; (2) no vitamin A activity; (3) convertible into vitamin A active substance by heat treatment; (4) an ultra violet absorption maximum at approximately 286 m$\mu$; (5) reacts with antimony trichloride to give a reaction product which has an absorption maximum at 428 m$\mu$; (6) a melting point of 95°–97° C.; (7) forms a dinitro benzoate having a melting point of approximately 200° C.; (8) forms a phenylazobenzoate having a melting point of 153–155° C.; (9) a molecular weight of approximately 572; (10) 8 double bonds in its molecule; (11) a specific optical rotation of about $-1.35$ (determined in chloroform at 25° C. and in light having a wave length of 546.1 m$\mu$); and (12) an extinction coefficient in ultra violet light of about 700 at approximately 286 m$\mu$; to a heat treatment at a temperaure of between about 150 and 300° C., the heating period being approximately inversely proportional to the temperature and ranging from three hours for the temperature of 150° C. to one-half second for the temperature of 300° C. whereby said chemical compound is converted into vitamin A.

12. A chemical compound which is obtainable from liver oils and which has the following properties: (1) the formula $C_{40}H_{58}(OH)_2$; (2) no vitamin A activity; (3) convertible into vitamin A active substance by heat treatment; (4) an ultra violet absorption maximum at approximately 286 m$\mu$; (5) reacts with antimony trichloride to form a reaction product which has an absorption maximum at 428 m$\mu$; (6) a melting point of 95°–97°; (7) forms a dinitro benzoate having a melting point of approximately 200° C.; (8) forms a phenylazobenzoate having a melting point of 153–155° C.; (9) a molecular weight of approximately 572; (10) 8 double bonds in the molecule; (11) a specific optical rotation of about $-1.35$ (determined in chloroform at 25° C. and in light having a wave length of 546.1 m$\mu$) and (12) an extinction coefficient in ultra violet light of about 700 at approximately 286 m$\mu$.

NORRIS D. EMBREE.
EDGAR M. SHANTZ.

Certificate of Correction

Patent No. 2,414,458. January 21, 1947.

NORRIS D. EMBREE ET AL.

It is hereby certified that the above numbered patent was erroneously issued to the inventors said "Embree et al." whereas said patent should have been issued to *Distillation Products, Inc., of Rochester, New York, a corporation of Delaware*, as assignee of the entire interest therein, as shown by the record of assignments in this Office; column 5, line 10, for the word "is" after "surface" read *in*; and that the said Letters Patent should be read with these corrections therein that the same may conform to the record of the case in the Patent Office.

Signed and sealed this 15th day of April, A. D. 1947.

[SEAL]

LESLIE FRAZER,
*First Assistant Commissioner of Patents.*